United States Patent
Kan et al.

(10) Patent No.: US 7,483,379 B2
(45) Date of Patent: Jan. 27, 2009

(54) PASSIVE NETWORK MONITORING SYSTEM

(75) Inventors: Chao Kan, Plano, TX (US); Pierrick Guingo, Dallas, TX (US)

(73) Assignee: Alcatel Lucent, Paris (FR)

( * ) Notice: Subject to any disclaimer, the term of this patent is extended or adjusted under 35 U.S.C. 154(b) by 1052 days.

(21) Appl. No.: 10/147,830

(22) Filed: May 17, 2002

(65) Prior Publication Data

US 2003/0214913 A1    Nov. 20, 2003

(51) Int. Cl.
*G06F 11/00* (2006.01)
*H04L 12/26* (2006.01)
(52) U.S. Cl. .................. 370/237; 370/252; 709/223
(58) Field of Classification Search ......... 370/229–238, 370/252, 401, 469; 709/223–224
See application file for complete search history.

(56) References Cited

U.S. PATENT DOCUMENTS

| | | | |
|---|---|---|---|
| 5,974,457 A * | 10/1999 | Waclawsky et al. ......... 709/224 |
| 5,982,753 A | 11/1999 | Pendleton et al. |
| 6,058,260 A * | 5/2000 | Brockel et al. .................. 703/4 |
| 6,539,425 B1 * | 3/2003 | Stevens et al. .............. 709/220 |
| 6,598,034 B1 * | 7/2003 | Kloth ........................... 706/47 |
| 2006/0126547 A1 * | 6/2006 | Puuskari et al. ............. 370/310 |
| 2006/0253903 A1 * | 11/2006 | Krumel ....................... 726/13 |

OTHER PUBLICATIONS

Brownlee, N., et al; "Traffic Flow Measurement: Architecture": Oct. 1999: RFC 2722; pp. 1-48.*
Ahmadi, Hamid; "Wireless and Mobile Networking in the Enterprise Environment": Nov. 27, 1995: Wireless Communications System Symposium, 1995: pp. 239-244.*
Cisco Systems; NetFlow Services and Applications; White Paper; Mar. 1999; http://www.cisco.com/warp/public/cc/pd/iosw/ioft/netlet/tech/napps_wp.htm; pp. 1-27.
Brownlee, et al; Traffic Flow Measurement: Architecture; IETF Network Working Group; RFC 2722; Oct. 1999; pp. 1-43.
Brownlee, et al.; Traffic Flow Measurement: Architecture: IETF RFC 2063; Jan. 1997.

* cited by examiner

*Primary Examiner*—Chau Nguyen
*Assistant Examiner*—Robert C Scheibel

(57) ABSTRACT

A network monitoring system (10). The system comprises a database (32) and at least one monitoring circuit (36) coupled to a network (20). Network traffic flows along the network in a form of packets. The at least one monitoring circuit is programmed to perform the steps of receiving a packet communicated along the network and determining whether data in the packet satisfies a rule set. Further, the at least one monitoring circuit is responsive to determining that data in the packet satisfies a rule set by copying information relating to the packet to be stored into the database. The system also comprises circuitry for querying the information communicated by the at least one monitoring circuit to the database to identify an irregularity in the network traffic.

30 Claims, 2 Drawing Sheets

PASSIVE NETWORK MONITORING SYSTEM

CROSS-REFERENCES TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

The present embodiments relate to computer networks and are more particularly directed to a real-time system for monitoring packet performance on such a network.

As the number of users and traffic volume continue to grow on the internet and other networks, an essential need has arisen for both the users and network operators to have a set of mechanisms to analyze the network traffic and understand the performance of the networks or underlying portions of the network. For example, such a need is prevalent for the underlying internet protocol ("IP") networks in the global internet. With these mechanisms, the users and network operators also can monitor and query the reliability and availability of the network nodes (e.g., IP routers) and the given internet paths, and the mechanisms also can identify the location of a segment of a given internet path, if any, that has a limitation. Additionally, the internet is evolving towards an advanced architecture that seeks to guarantee the quality of service ("QoS") for real-time applications, such as by putting limits on the upper bound on certain QoS parameters including jitter, throughput, one-way packet delay, and packet loss ratio. Accordingly, tracking QoS performance is also desirable. Given the preceding, various mechanisms for network monitoring have been developed in the art, some of which are described below.

A first type of network performance analysis mechanism is known in the art as an active mechanism. The active network performance monitoring system sends a series of special test packets or query packets to the underlying networks or routers, and it analyzes the response with a specific purpose. Currently, most tools for active end-to-end QoS monitoring in IP networks are based on the traditional "ping" (i.e., ICMP echo and echo response messages) to measure the roundtrip delay between two hosts. Variations of ping include "Nikhef ping," "fping," "pingplotter," "gnuplotping," "Imeter," and "traceping". Several other tools are variations based on the traditional "traceroute" (which exploits the time-to-live field in the IP packet header), for example, "Nikhef traceroute," "pathchar," "whatroute," and "network probe daemon." A few large-scale research projects are using "ping" to continually and actively monitor the network performance between various points in the Internet. Examples of these types of projects are: (i) the PingER project at Stanford Linear Accelerator Center ("SLAC") uses repeated pings around various Energy Sciences Network ("ESnet") sites; (ii) the Active Measurement Program ("AMP") project by National Laboratory for Applied Network Research ("NLANR") performs pings and traceroutes between various NSF-approved high-performance connection sites; (iii) the Surveyor project attempts one-way packet delay and loss measurements between various sites using the global positioning system ("GPS") for time synchronization; and (iv) the national Internet measurement infrastructure ("NIMI") project measures the performance between various sites using traceroute or transmission control protocol ("TCP") bulk transfer.

A second type of network performance analysis mechanism is known in the art as a passive mechanism and may be contrasted to the active mechanism discussed above. The passive network performance monitoring system performs its traffic analysis in a non-invasive way with respect to the observed networking environment, namely, the system does not introduce additional test packets to the network. As a result, the system does not affect the performance of the network while doing the measurements and querying. The traditional approach usually involves the following three steps: (i) collection of the entire TCP/IP packet (e.g. traffic sniffers, etc.) or the entire packet header data into a database or databases; (ii) hardware and software for analyzing the collected database(s); and (iii) off-line traffic characterization and modeling. Various examples of passive mechanisms have been implemented by certain entities. For example, the NLANR has been using OCXmon monitors to tap into the light of a fiber interconnection by means of optical splitters, and from the connection the system collects a portion of the packet, namely, the packet header. Specifically, traffic data is collected in an abstract format by extracting and storing the packet header in the database within a preset traffic aggregation period. The packet header traffic data in the database is later analyzed (i.e., an off-line traffic analysis). As another example, Cisco offers a NetFlow capability in its large routers. NetFlow identifies traffic flows based on IP source/destination addresses, protocol ID field, type of service ("TOS") field, and router port. Once identified, statistics can be collected for a traffic flow, and exported via user datagram protocol ("UDP") when the flow expires. Flow statistics may include the flow start/stop times, number of bytes/packets, and all IP header fields. As a final example, Lucent Bell Labs has various research projects in traffic analysis, which are mainly concentrated in collection of TCP/UDP/IP packet headers and off-line traffic analysis, modeling and visualization.

A third type of network performance analysis mechanism is also a type of passive mechanism in that it does not add traffic to the network, but rather than collecting information directly from a packet it instead collects statistics pertaining to the packet; this system is sometimes referred to as a network or element management system. In this system, instead of separately setting up the packet collection process, IP routers periodically (e.g., in 30 minute intervals) store and collect a set of traffic statistics into a built-in Management Information Base ("MIB") using a simple network management protocol ("SNMP") interface, and those statistics may be retrieved by a network or element manager. Typical traffic statistics might be the number of received/forwarded packets, discarded packets, error packets, port utilization, CPU utilization, buffer utilization, and so forth. As in other passive systems, these statistics are collected for later analysis. When a network congestion or event occurs, the SNMP agent embedded in the IP router sends a trap message to the SNMP manager, which then indicates an alarm in its graphic user interface.

While the preceding systems have provided certain levels of information about the behavior of traffic in IP networks, the present inventors have observed that such systems also provide various drawbacks. As an example of a drawback with respect to the active systems, they are required to send special test or PING packets and, thus, these additional packets themselves introduce additional traffic onto the route of the regular data packets. Accordingly, at the time of detecting the network congestion or server availability, the network performance and associated QoS being measured will be negatively impacted by this additional burden. Additionally, the QoS is measured for the test packets instead of the actual data packets, and the QoS for the data packets must be inferred indirectly from the QoS measured for the test packets. As an example of a drawback with respect to the passive system, although many traffic studies have attempted to understand the random behavior or composition of internet traffic, these traffic studies have been off-line analysis of historical data. There are no known prominent research projects attempting traffic analysis and control based on real-time traffic measurement or comprehensive traffic profiling. For example, Lucent's projects reflect the traditional approach of collecting large traffic measurement datasets for lengthy periods of time such as on the order of many days and then performing subsequent off-line statistical analysis. Cisco NetFlow essentially measures the volume and duration of each traffic flow for the purposes of accounting and off-line traffic analysis, but is not intended to be used for real-time network monitoring and querying. The OCXmon tool from NLANR is only for asynchronous transfer mode ("ATM") traffic, and is not for the purpose of traffic monitoring and control. Given the off-line use of these tools which, by definition, is delayed by some time which may be on the order of days, any conclusion that may be drawn from the collected data is stale in the sense that it applies to the network environment as it existed at some previous time rather than having a high likelihood of characterizing the network at the time the analysis is concluded; in other words, the status of the network is likely to have changed between the time these prior art systems collect their data and the time they drawn any inferences or conclusions during their off-line analysis. Thus, by time the results provide meaningful indicators, the real-time status of the network may have changed. Finally, as an example of a drawback of the element management system, the router MB is usually designed based on the specific structure and implementation of the underlying network or IP router and, therefore, it will not be the same for equipment from different vendors. For example, the Argent Guardian tool from Argent Software Inc. for performance monitoring and proactive problem detection and correction has different versions for different monitored entities. The Argent Guardian for Cisco can only be used for Cisco routers because it uses the Cisco router MIB to retrieve and query the traffic information. In addition, the MIB is commonly embedded in the IP router. As a result of these constraints, there is considerable difficulty in changing the MIB once the design is complete. Accordingly, there are considerable barriers to the use of such a system in the instance where there is a change in the parameters or statistics to be monitored and where the change is not already built into the MIB.

In view of the above, there arises a need to address the drawbacks of the prior art as is accomplished by the preferred embodiments described below.

BRIEF SUMMARY OF THE INVENTION

In the preferred embodiment, there is a network monitoring system. The system comprises a database and at least one monitoring circuit coupled to a network. Network traffic flows along the network in a form of packets. The at least one monitoring circuit is programmed to perform the steps of receiving a packet communicated along the network and determining whether data in the packet satisfies a rule set. Further, the at least one monitoring circuit is responsive to determining that data in the packet satisfies a rule set by copying information relating to the packet to be stored into the database. The system also comprises circuitry for querying the information communicated by the at least one monitoring circuit to the database to identify an irregularity in the network traffic.

Other aspects are also described and claimed. For example, in the described system, the database stores the rule set. As another example, in the described system, there also may be a plurality of monitoring circuits coupled to the network. In this case, the plurality of monitoring circuits include the at least one monitoring circuit, and wherein each of the plurality of monitoring circuits comprises a corresponding database. As another example, where there are a plurality of monitoring circuits coupled to the network, each of those monitoring circuits is programmed to perform the steps described above relative to the at least one monitoring circuit.

Other circuits, systems, and methods are also disclosed and claimed.

DETAILED DESCRIPTION OF THE INVENTION

Figure 1:
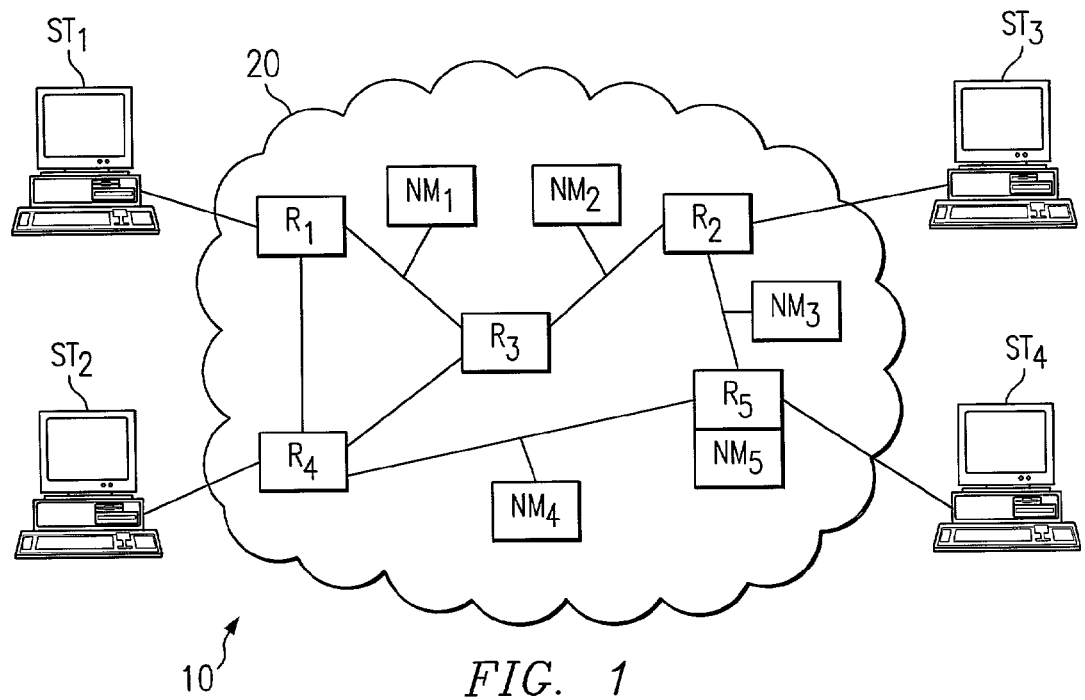
FIG. 1 illustrates a block diagram of a network system 10 into which the preferred embodiments are implemented.

FIG. 1 illustrates a block diagram of a system 10 into which the preferred embodiments are implemented. System 10 generally includes a number of stations $ST_1$ through $ST_4$ each coupled to a network 20; by way of example, network 20 is an internet protocol ("IP") network such as the global internet or other IP-using network, where each station and IP networks in general are well known in the art. However, one skilled in the art should appreciate that the use of the IP protocol is by way of illustration, and many of the various inventive teachings herein may apply to numerous other protocols, including by way of examples asynchronous transfer mode ("ATM"), token ring, Novell, Apple Talk, and still others. In any event, returning to network 20 as in IP network, and also by way of an example, each station $ST_x$ may be constructed and function as one of various different types of computing devices, all capable of communicating according to the IP. Within network 20 are shown a number of routers $R_1$ through $R_5$, each connected within the network and by way of example to another router, a station, or both a router and a station. Thus, in the illustrated example, router $R_1$ is connected to routers $R_3$ and $R_4$ as well as station $ST_1$, router $R_2$ is connected to routers $R_3$ and $R_5$ as well as station $ST_3$, router $R_3$ is connected to routers $R_1$, $R_2$ and $R_4$, router $R_4$ is connected to routers $R_1$, $R_3$, and $R_5$ as well as station $ST_2$, and router $R_5$ is connected to routers $R_2$ and $R_4$ as well as station $ST_4$. Each router $R_x$ also generally may be constructed and function according to the art, with the exception of router $R_5$ that functions as known in the art, yet as illustrated in FIG. 1 it also includes a network monitor function $NM_5$ described below. Given the various illustrated connections, in general IP packets flow along the various illustrated paths of network 20, and in groups or in their entirety such packets are often referred to as network traffic. In this regard and as developed below, the preferred embodiments operate to identify any irregularities in such network traffic. Finally, note that FIG. 1 may represent a simplified version of a network or the internet in that only a few stations and routers are shown, while one skilled in the art will readily appreciate that the inventive concepts in this document may be applied to a larger number of stations, routers, and the network interconnectivity between those devices.

FIG. 1 also illustrates a number of network monitors $NM_1$ through $NM_5$, where the choice of five such network monitors is only by way of example given the limited amount of other hardware that is shown for network 20. As detailed below, each network monitor $NM_x$ is operable to sample IP packets, or a portion of each IP packet, that passes along the conductor to which the network monitor is connected. Further, the components of each network monitor $NM_x$ are described below, but at this point the connections of each such monitor are noted. Network monitor $NM_1$ is connected to sample packets passing along the conductor(s) between routers $R_1$ and $R_3$, network monitor $NM_2$ is connected to sample packets passing along the conductor(s) between routers $R_2$ and $R_3$, network monitor $NM_3$ is connected to sample packets passing along the conductor(s) between routers $R_2$ and $R_5$, network monitor $NM_4$ is connected to sample packets passing along the conductor(s) between routers $R_4$ and $R_5$. Finally, network monitor $NM_5$ is part of router $R_5$ and, as such, it is connected to sample packets routed by router $R_5$. Thus, the contrast of network monitor $NM_5$ to the other illustrated network monitors $NM_1$ through $NM_4$ is shown to demonstrate that in the preferred embodiment each network monitor may be formed as a stand alone entity or may be combined with the hardware and software of an existing router; indeed, in the preferred embodiments a network monitor also may be combined with network or element management systems. In any event and by way of introduction to details provided later, in the preferred embodiments the sampling functionality of each network monitor $NM_x$ permits real-time monitoring of the IP network performance, querying router availability, detecting network congestion, and measuring QoS parameters all in response to data obtained via the network monitors and stored in a database system and in an effort to identify any irregularities in such monitored aspects.

Figure 2:
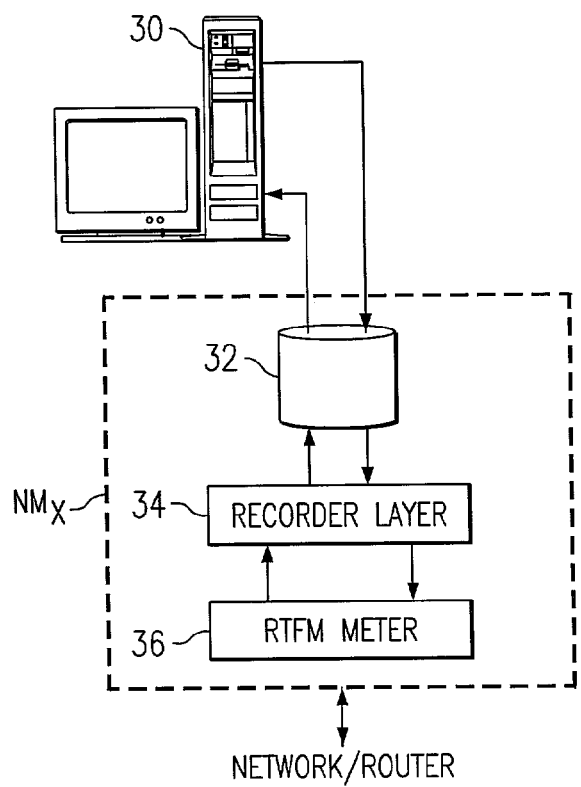
FIG. 2 illustrates a block diagram of each network monitor $NM_1$ through $NM_4$ of FIG. 1.

FIG. 2 illustrates a block diagram of each network monitor $NM_1$ through $NM_4$ of FIG. 1, with the further understanding that functionally the following description also may be applied to network monitor $NM_5$ with the addition that certain functionality may be provided by the hardware and software already available from router $R_5$. Turning then to FIG. 2, first note that a console 30 is associated with network monitor $NM_x$, where in the preferred embodiment a single such console 30 communicates with multiple network monitors $NM_x$. For example, returning briefly to FIG. 1, preferably each of network monitors $NM_1$ through $NM_5$ communicates with a single console 30, where such communications also may be by way of IP packets between console 30 and the network monitors $NM_x$. Console 30 may be constructed by one skilled in the art using various forms of hardware and software, where the selection is a matter of implementation choice in order to achieve the functionality described in this document. Turning to that functionality, console 30 preferably provides an administration (configuration) function and a characterization (reporting) function. To permit a user to perform these functions, various interfaces may be used such as a graphical Web-based configuration tool or a command line tool, where one preferable approach implements console 30, by way of example, using the Apache Web server with the PHP server-side scripting language to provide a dynamic interface to a flow store 32, detailed below. In any event, the user interface preferably provides different screens for each of the administration and characterization functions. Moreover, console 30 preferably presents a number of configuration pages, reflecting the structure of any flow databases(s) in flow store 32. The actual interface and screens, however, may be implemented in various forms, where it is desirable for any form that a user can properly control console 30 to perform its administration and characterization function with respect to its flow store 32. Preferably, a network administrator or the like uses the administration functionality of console 30 first to create rule sets as detailed below in a screen, where IP packets are then monitored according to the rule sets as also discussed below. Also, once the system is configured and left to collect information from or about the monitored IP packets, the network administrator can use the characterization screen to query the information so as to generate network status reports based on the collected information and to thereby detect any network irregularities.

Figure 3:
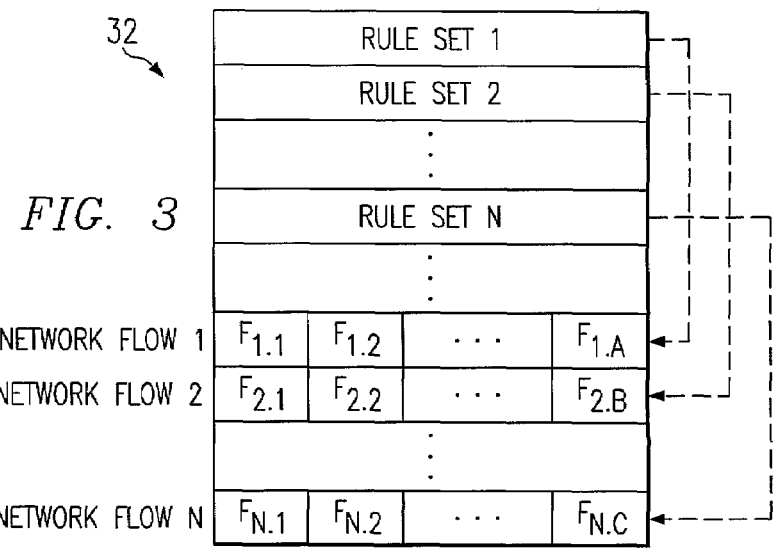
FIG. 3 includes a logical illustration of the flow database within flow store 32 of FIG. 1.

As introduced above, console 30 is connected to a flow store 32, which preferably represents a storage medium that stores a flow database. In the preferred embodiment, each network monitor $NM_x$ includes its own flow database, although alternative embodiments may be created where more than one network monitor $NM_x$ shares a common flow database. In the preferred embodiment the flow database in flow store 32 is an SQL-compatible database using the PostgreSQL relational database management system, and console 30 communicates with this database through the Web server's PHP link to the SQL database. Thus, any administration and configuration changes made via console 30 are passed directly to flow store 32. Given the preceding, one skilled in the art should appreciate that access to flow store 32 can be achieved by SQL queries, enabling network administrators to automate the configuration process or integrate report generation. In the preferred embodiment, flow store 32 stores what is referred to in this document as a "rule set" (or "rule sets" when plural), which is initially provided to the flow store 32 from console 30 as part of the administration function of console 30 and which is illustrated by way of example in FIG. 3. Looking then to FIG. 3, it includes a logical illustration of the flow database within flow store 32, and the flow database includes a total of N rule sets designated RULE SET 1 through RULE SET N. Each rule set includes one or more criteria that may be measured from either data in or relating to each IP packet. The first time, if ever, that a rule or rules in a rule set are satisfied by an IP packet, a new respective network flow entry is created in the flow database in flow store 32. By way of example, therefore, FIG. 3 illustrates that each of the N rule sets has been satisfied at least once and, thus, flow store 32 also includes N NETWORK FLOWs, each of which is shown to correspond to a RULE SET as indicated by a dashed arrow. Further, within each network flow, one or more fields may be created based on the criteria in the corresponding rule set; thus, the number of fields in a given network flow may differ from the number of fields in a different network flow. This distinction is shown in FIG. 3 by indicating that NETWORK FLOW 1 has A fields $F_{1,1}$ through $F_{1,A}$, NETWORK FLOW 2 has B fields $F_{1,1}$ through $F_{1,B}$, and so forth through NETWORK FLOW N which has C fields $F_{1,1}$ through $F_{1,C}$. If the rule or rules of a rule set have been previously satisfied by a previous IP packet, the status of the corresponding network flow entry in the flow database is updated, such as by updating one or more of the fields in the rule set.

In the preferred embodiments, each rule set may be of various forms. One preferred example of a rule set is a set of criteria that includes all IP packets with a specified source IP address and/or a specified destination IP address. Another example of a rule set, and that may be used alone or in combination with the previous example, includes all IP packets with a specified start and/or a specified ending time, or having start and ending times within a specified range. Still other rule set examples include rules directed to IP packet port and IP packet size. Moreover, note that these rules according to the preferred embodiment may pertain to different portions of the IP packet. For instance, the preceding examples apply to data carried in an IP packet header; however, the preferred embodiments also contemplate network flow rules directed to the IP packet payload as opposed to the header, such as may be the case for a network flow directed to QoS or other information located in the packet payload. In any event, preferably flow store 32 stores selected portions of IP packets or statistics that are selected or generated by a meter 36 when a rule set is satisfied, where the rule set also specifies the IP packet portion and/or statistic to be stored. Finally, note that the IP packet data and statistics are provided in flow store 32 in various formats, such as preferably summarizing it by details on QoS parameter measurement, network performance, and router congestion and availability.

Returning to FIG. 2, recorder layer 34 provides the rule sets in flow store 32 to a meter 36 (or meters) in use and coupled to the network, and meter 36 identifies IP packets in response to those rules. Further, as each IP packet is identified in this manner, meter 36 provides a portion(s) of the packet and/or a statistic(s) relating to the packet to recorder layer 34, which in turn communicates those selected portions and/or statistics of the identified packets to flow store 32. Thus, the applications of recorder layer 34 can be separated into two categories: manager applications and meter reading applications. Manager applications configure meter 36, based on rule sets in flow store 32. Meter reading applications convert the IP packet data collected by meter 36 into the data format used by flow store 32, and insert it into the flow database of flow store 32. Recorder layer 34 applications may pass information between flow store 32 and the network probes of meter 36 either synchronously or asynchronously. This gives network administrators the flexibility of either using real-time network flow meters (i.e. NeTraMet) or importing data from other network analysis tools that are not able to provide real-time data (e.g. Cisco NetFlow data).

In the preferred embodiment, meter 36 is a Real-Time Traffic Flow Measurement ("RTFM") meter which is a concept from the Internet Engineering Task Force ("IETF"). As known in the RTFM art, RTFM meters are previously known to be used in systems for determining the service requested by IP packets that are passing through a network for purposes of collecting revenue, where such a service is identifiable by the router port number specified in each IP packet. For example, RTFM meters are currently being considered for use in systems whereby an internet user is charged based on the service he or she is using on the internet; for example, a different fee may be charged to the user for each different internet service, including mail, video, phone calls, and web browsing. However, as detailed in this document, the preferred embodiment implements the RTFM meter instead to analyze each IP packet (in response to the rule set(s) in flow store 32) and in response to select portions of rule-satisfying packets, or collect statistics about those packets, for storage so that those portions/statistics can be queried and thereby interpreted for purposes of monitoring network activity so as to evaluate network performance and, hence, identify any irregularities with such performance. More specifically, meter 36 physically probes the underlying network traffic and each time meter 36 detects an IP packet on the network, it determines whether the packet satisfies any of the rule sets stored in its corresponding flow store 32. Accordingly, during the real-time passage of numerous IP packets by the evaluating meter 36, that meter 36 does not always copy a fixed portion of each such packet into a database such as the entire packet or the entire packet header; instead, each meter 36 evaluates the portion(s) of each packet as defined by the rule set(s) and, if a rule set is satisfied by that packet, then an action is also taken as stated by the corresponding rules set, such as copying one or more portions of that packet and/or packet statistics into the network flow that corresponds to the satisfied rule set, whereby meter 36 communicates the network flow information to recorder layer 34. In response, recorder layer 34 inserts the captured IP packet data and/or statistics into the appropriate network flow in flow store 32. Accordingly, that stored information is then available for querying by and reporting to console 30.

FIG. 4 again illustrates network 10 of FIG. 1, but as a simplified example three permissible routes are illustrated in FIG. 4 and are shown as routes (I) through (III), as further indicated according to the legend shown in the bottom right corner of the Figure. Given these permissible routes, an IP routing table will be formed and may be stored in various of the routers and monitors of FIG. 4, where such a table is shown in the following Table 1:

TABLE 1

| | (Route_Information_Table, #R) | |
|---|---|---|
| Router Involved | (Source Router #, Destination Router #) | Route Number |
| $R_1$ | $(R_1, R_5)$ | (I) |
| $R_3$ | $(R_1, R_5)$ | (I) |
| $R_2$ | $(R_1, R_5)$ | (I) |
| $R_5$ | $(R_1, R_5)$ | (I) |
| $R_2$ | $(R_2, R_4)$ | (II) |
| $R_3$ | $(R_2, R_4)$ | (II) |
| $R_4$ | $(R_2, R_4)$ | (II) |
| $R_5$ | $(R_5, R_1)$ | (III) |
| $R_4$ | $(R_5, R_1)$ | (III) |
| $R_1$ | $(R_5, R_1)$ | (III) |

Figure 4:
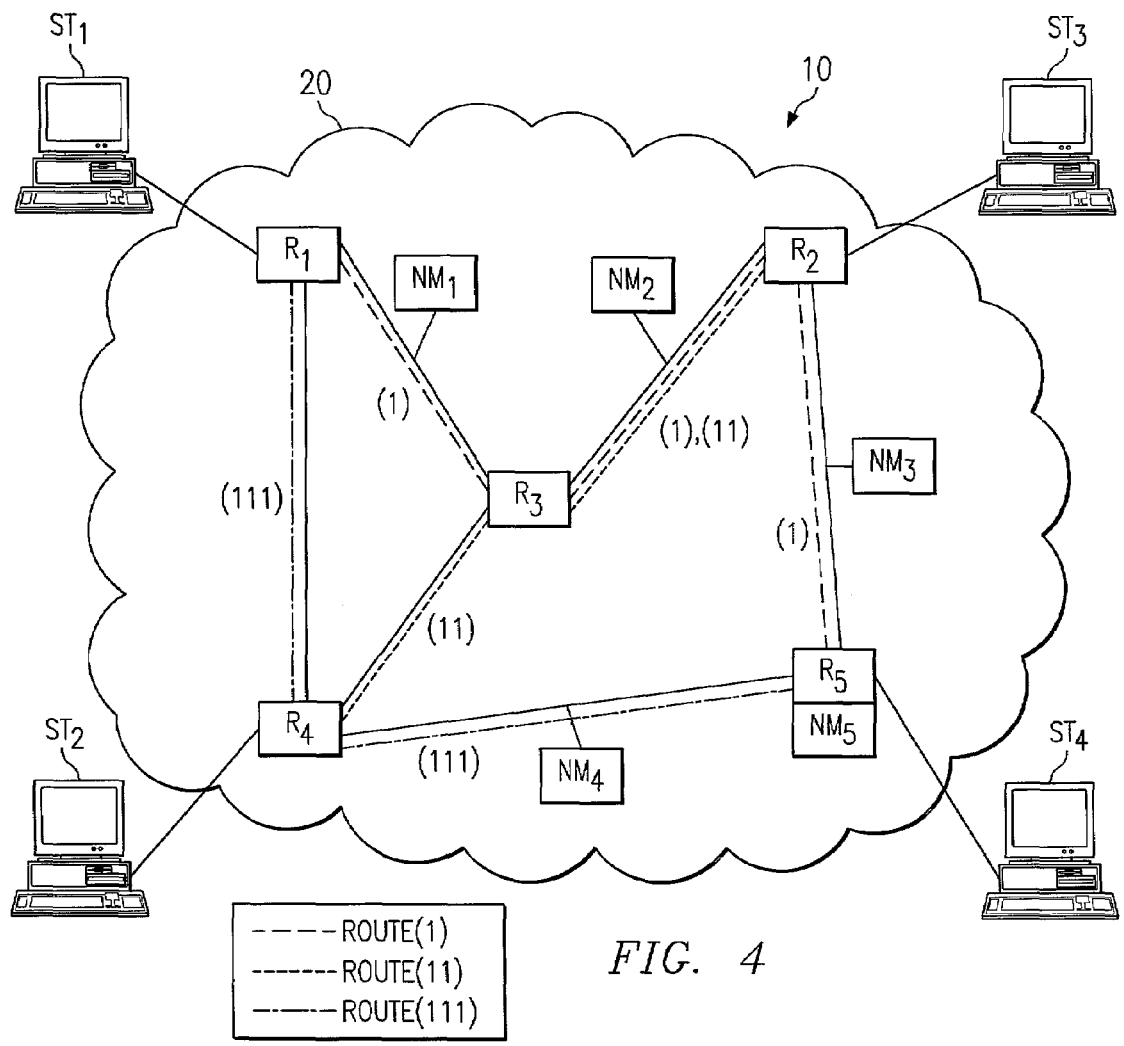
FIG. 4 again illustrates network system 10 of FIG. 1, but as a simplified example of network traffic three permissible packet routes are illustrated.

In Table 1, each routing row R (i.e., each row other than the headings in the top row) provides routing information, and thus the entirety of Table 1 identifies the three permitted routes as between the various routers of system 10 as illustrated in FIG. 4. Thus, the first four routing rows (i.e., Row 1 through Row 4) of Table 1 illustrate a route (I) that a packet is to take with a source of router $R_1$ and a destination of router $R_5$; specifically, the packet travels along route (I), from router $R_1$ to router $R_3$ to router $R_2$ to router $R_5$. The fifth through seventh routing rows of Table 1 (i.e., Row 5 through Row 7) illustrate a route (II) that a packet is to take from router $R_2$ to router $R_4$, and the last three routing rows of Table 1 (i.e., Row 8 through Row 10) illustrate a route (III) that a packet is to take from router $R_5$ to router $R_1$. Given these routes, the following discussion illustrates how the preferred embodiment operates to detect a potential network traffic irregularity with respect to such routes.

With knowledge of the Route_Information_Table in Table 1, a network manager or the like with access to console 30 uses the administration function to establish a traffic flow rule set to collect IP packet portions or statistics from selected IP packets and so that flow may be evaluated from such portions or statistics. As one example of the preferred embodiment, a network manager enters sufficient directions to filter the IP header for each packet to identify each internet control message protocol ("ICMP") message. As known in the IP art, ICMP is a required protocol tightly integrated with IP, and ICMP messages are delivered in IP packets and are used for out-of-band messages related to network operation or misoperation in various instances. In one instance, ICMP messages are used to announce network errors, such as when a portion of the network is unreachable. As another instance, ICMP messages are issued when a router begins buffering too many packets due to its inability to transmit them at the rate being received. As still another instance, if an IP packet's timeout (i.e., TTL) field drops to zero, the router discarding the packet often generates an ICMP packet indicating this event. In any event, given the information available from ICMP messages and returning to the example of the preferred embodiment, in the present case meter 36 examines the header of each IP packet passing though any of the corresponding network monitors $NM_x$ to identify in real time whether the packet is an ICMP message; if so, then a portion of that IP packet or one or more statistics relating to the packet, as also specified by the rule set, is communicated into each respective flow store 32. Indeed, to further illustrate these operations, an example is provided below wherein this rule set is provided, that is, for each meter 36 to identify whether each IP packet is an ICMP message. If so, then the information collected from each such ICMP message packet is the source and destination address from the IP header of such a packet, and meter 36 communicates this information to its respective recorder layer 34, from which it will be placed in flow store 32.

To further illustrate the preceding example of a rule set and corresponding network flow directed to ICMP messages, assume there is link failure between routers $R_2$ and $R_3$ in FIG. 4. As a result, ICMP messages are likely to be issued by routers or applications running on routers in system 10 and, hence, one or more of the network monitors $NM_x$ will encounter those ICMP messages and store the designated portion of the headers of those messages (i.e., the source and destination address) into network flows of their respective flow stores 32. Thus, in one or more of the flow stores 32, there will be stored in one or more network flows the simplified messages and packet data shown in the following Table 2:

TABLE 2

(Message_Information_Table, #M)

| Message Type | (Source Router #, Destination Router #) |
|---|---|
| ICMP | $(R_1, R_5)$ |
| ICMP | $(R_2, R_4)$ |

In Table 2, each message #M provides the source and destination address of an ICMP message packet, where the addresses are copied into a flow store 32 via recorder layer 34 as an RTFM meter encountered the ICMP message packet along network 20.

Next, given the network flow set of rules, the network manager or the like uses console 30 to query the network flow(s) so as to characterize (i.e., report on) the packet information stored in one or more flow stores 32 and, indeed, preferably in a number of flow stores 32 corresponding to a number of different network monitors $NM_x$. Toward this end, in the preferred embodiment certain predefined queries may be made available to the network manager so that he or she does not have to create them. In any event, in the present example, the query may be of the following pseudo form:

SELECT node FROM Route_Information_Table R, Message_Information_Table M WHERE M.type=ICMP The pseudo query is intended to cause the report to indicate, for each message #M of the ICMP type in the Message_Information_Table (i.e., Table 2), the node in the Route_Information_Table (i.e., Table 1) having a same Source Router # and Destination Router # as the Source Router # and Destination Router # in the message #M. For example, for message #1 in the Message_Information_Table, it has a Source Router # and Destination Router # of $(R_1, R_5)$. Thus, the query causes a report of each node in the Route_Information_Table that has that same Source Router # and Destination Router # of $(R_1, R_5)$, which thereby reports the nodes $R_1$, $R_2$, $R_3$, and $R_5$. Similarly, for message #2 in Table 2, it has a Source Router # and Destination Router # of $(R_2, R_4)$. Thus, the pseudo query causes a report of each node in Table 1 that has that same Source Router # and Destination Router # of $(R_2, R_4)$, which thereby reports the nodes $R_2$, $R_3$, and $R_4$. Thus, the results of the pseudo query can be reported in the form of the following Table 3:

TABLE 3

(report from pseudo query)

| Node Involved in Message |
|---|
| $R_1$ |
| $R_3$ |
| $R_2$ |
| $R_5$ |
| $R_2$ |
| $R_3$ |
| $R_4$ |

From Table 3, it can be seen that routers $R_2$ and $R_3$ are most frequently involved as source or destination in the ICMP messages. This greater frequency suggests an irregularity (e.g., a failure) with respect to either router $R_2$, or Router $R_3$, or the link between routers $R_2$ and $R_3$. The basic idea behind this example is that if two routes are missing their connections and their corresponding paths in the network are between the same routers, then either the path or the routers connected to it are not working properly.

Also according to the preferred embodiment, console 30 may program a real-time response to occur in response to the conclusions drawn from the real-time collection of IP packet portions and/or statistics gathered by the meters 36. In the previous example, therefore, console 30 may perform an analysis of the preceding Table 3 and draw one or more inferences or conclusions about network traffic regularity in view of the data; specifically, from that Table, if a suggestion of a network irregularity exists, then console 30 may determine alternative packet routes so that packets may be redirected to avoid the problematic path or node(s). In the previous example, therefore, an example of redirection for the network paths and as generated by console 30 is as shown in the following Table 4:

TABLE 4

| Route | (Source Router #, Destination Router #) | IP Router in the Route (Original) | IP Router in the Route (New) |
|---|---|---|---|
| I | $(R_1, R_5)$ | $R_1, R_3, R_2, R_5$ | $R_1, R_3, R_4, R_5$ |
| II | $(R_2, R_4)$ | $R_2, R_3, R_4$ | $R_2, R_5, R_4$ |

Given Table 4, and since console 30 is also aware of the routing information of various nodes such as from Table 1, then console 30 can pass on the Table 4 information to one or more multiple routers through the network or element management system in the console 30, thereby causing network traffic to be re-routed based on that information. Thus, following the implementation of the redirected paths of Table 4, any problem with the path between routers $R_2$ and $R_3$ is avoided. For example, the first re-routing row of Table 4 indicates that for an IP packet to travel from router $R_1$ to router $R_5$, it previously (from Table 1) took the path through routers $R_1$, $R_3$, $R_2$, and $R_5$. However, once Table 4 is established and implemented into the network, instead such an IP packet takes the path through routers $R_1$, $R_3$, $R_4$, $R_5$; by tracing this alternative path in FIG. 4, one skilled in the art will find that the packet does not travel between routers $R_2$ and $R_3$, thereby avoiding any congestion or other problem between those routers. Similarly, the second re-routing row of Table 4 also redirects IP packets away from the path between routers $R_2$ and $R_3$. As a result of the above, note that the real-time data collected by meter 36 permits a near-immediate and, thus, real-time corrective action to be taken electronically, such as on the order of less than five minutes after the IP packet data (or statistics) is collected. Indeed, preferably the corrective action is even faster so as to minimize the burden or appearance of any network irregularity to any network user. Accordingly, automated electronic real-time correction in terms of less than one minute are preferred. Thus, unlike the prior art wherein data analyses are performed off-line at a considerable delay and when the then-existing status of the network may have changed from when the time the data was collected, the preferred embodiments permit a contemporaneous review of the data so that action may be taken while the network is presumably still under the duress of the existing irregularity (ies).

The preceding example provides logical steps on how the preferred embodiments operate to collect information relating to IP packets into flow store(s) 32, where such information may be portions of the packets and/or statistics relating to the packets, and to query the network flows in flow store(s) 32 and thereby detect a link irregularity based on the ICMP messages retrieved in response to the rule sets applied by the RTFM meters 36 of each of the network monitors $NM_x$ in system 10. However, one skilled in the art should appreciate that the example is only one preferred operation of the inventive teachings, where various alterations are contemplated. For example, while the preceding rule set and resulting network flow is directed to ICMP messages, other rule sets may be directed to other types of IP packets, and as indicated earlier the rule set may be directed to different parts of the packet, including either or both of the packet header and the packet payload. The latter may be helpful in creating network flows that are based on matters such as QoS as indicated in the packet payload, as illustrated by other examples below. Additionally, note that the example of Tables 1 through 3 also demonstrates why the preferred embodiments distribute a number of network monitors $NM_x$ in the network being analyzed. Specifically, if only one such monitor were implemented, then the rule set would be applied to a correspondingly limited number of IP packets. As such, even if the rule set were met (e.g., ICMP messages as above), drawing an inference or conclusion about network traffic regularity from such limited information may be difficult if not impossible. Accordingly, the preferred embodiment distributes a number of network monitors $NM_x$ in the network so as to collect more thorough IP packet information.

By way of another example of the operation of the preferred embodiments, a network administrator may evaluate network traffic regularity by identifying what network paths are in use for video service with the best QoS parameters, that is, for QoS exceeding a value X. Toward this end, the network administrator may issue from console 30 the following query command:
SELECT source destination FROM flows WHERE service=video AND (QoS parameters>X)

Note that "service" in the query refers to a field in the IP header that indicates the service type of the data in the packet payload, such as mail, video, phone calls, and web browsing, where the service type may be identified from the router port number included in the IP header. Thus, in response to the present example query and one or more underlying rule sets examined by the query, each meter 36 evaluates the service type and QoS of each message, where the former is located in the IP packet header and the latter is located in the IP packet payload. When the rule set conditions of service=video and QoS>X are met, then the meter 36 selects, as indicated by the rule set, the source/destination for that IP packet. This source/destination therefore identifies the end user using the video services. Further, the selected IP packet data is forwarded by meter 36 to recorder layer 34 which in turn stores it in flow store 32. From there, the query can cause generation of a report of the stored source/destination addresses. Additionally, various network performance conclusions may be drawn if certain routes are shown to provide the QoS greater than X while other routes do not, and if desired network traffic can be re-routed based on such conclusions. Note also that using QoS to evaluate network performance differs from the prior art wherein QoS (and status) is typically used by independent nodes to adjust their operation. For example, QoS parameters (e.g., jitter, throughput, delay) may be used by a source computer to ensure the quality of video in response to abnormal network situation. Finally, note that the service type of the preceding query and as shown in the router port number is not to be confused with the IP defined "type of service" ("TOS") field in the IP header, which is composed of a 3-bit precedence field (not in use today), 4 TOS bits, and an unused bit that must be zero. The 4 TOS bits are: minimize delay, maximize throughput, maximize reliability, and minimize monetary cost.

As mentioned above, in the preferred embodiment each meter 36 not only operates to selectively copy IP packet data when a rule set is satisfied, but meter 36 also may provide statistics relating to each IP packet that satisfies a rule set, as is now shown by way of example. Particularly, consider a case where the network administrator evaluates network performance by identifying what kind of services have difficulties going through the network, and toward that end they may issue the following query command and one or more underlying rule sets via console 30:
SELECT service FROM flows WHERE (packet loss>Y)

Again, "service" in the query refers to the intended service for the data in the packet payload and is identifiable from the port number included in the IP header. Packet loss, however, is not actual data in the IP packet per se; instead, it represents a statistic that is computed by meter 36 as it incurs IP packets. In the present example, packet loss is intended to identify any instance where a packet is lost by the network. Specifically, for a given TCP communication between a single source address and a single destination address and of the same service type, each successive IP packet according to the TCP protocol will have a consecutive sequence number. In order to evaluate the present example, therefore, meter 36 initiates a statistic counter and observes each such IP packet to ensure that successive TCP sequence numbers are encountered. If there is an instance where there is a gap in the sequence, then meter 36 increments the statistic counter for the same difference as represented by the gap (e.g., one increment if the gap skips one TCP sequence number, two increments if the if the gap skips two TCP sequence numbers, and so forth). Given these operations, at any point the statistic counter provides an indication of how many IP packets are lost as between this given source and destination address for the given service, and this statistic is passed by meter 36 to a network flow in flow store 32 (e.g. in a field of a network flow). Thereafter, returning to the pseudo query immediately above, if the count exceeds the value Y, then console 30 can generate a report from the network flow that identifies the service for which packet loss exceeds Y. Additionally, real-time corrective action can be taken, such as re-routing network traffic in an effort to reduce packet loss for the service at issue.

From the above illustrations and description, one skilled in the art should appreciate that the preferred embodiments provide a real-time passive IP network monitoring system with numerous benefits over the prior art. As one example of a benefit, unlike the prior art active systems, the preferred embodiments do not send special test packets (e.g., PING) and do not introduce additional test traffic onto the route of the regular data packets. Thus, in this sense the preferred embodiments do not impact the network performance. As another example of a benefit, as compared to the traditional passive measurement mechanisms in which the IP packets (or portions thereof) are routinely stored and then later studied using an off-line analysis of historical data, the preferred embodiments use real-time RTFM meters to evaluate portions of packets as they are incurred during actual real-time traffic flow and to store portions of those packets (or statistics relating thereto) that satisfy network flows; this stored data is also preferably used in a real-time manner within a few minutes of when the packet data or statistics are collected by querying such information to evaluate the performance and status of the underlying network and to take corrective action(s), if necessary. As still another example of a benefit, most network or element management systems for IP routers use SNMP MIBs for performance statistics and network alarms. However, MIBs are data models of the hardware implementation of routers, so the MIB is not easily adapted if something not specified in the MIB needs to be monitored. In addition, MIBs provide single point analysis directed to the traffic flow at the location of the MIB. In contrast, the preferred embodiments contemplate analyzing real-time collected packet information from multiple points in the network and they are not constrained to the hardware type or manufacturer of each router. Still further, the preferred embodiments also provide numerous benefits inherited from the following intrinsic advantages of RTFM meter architecture: (1) all data on the IP network is recordable; (2) functional even when the given network elements are incapable of flow monitoring; (3) independence from physical and data layer technologies; and (4) good performance even during fault conditions. In all events, the preceding as well as other benefits should be appreciated by one skilled in the art. As a final benefit, while the preferred embodiments are particularly advantageous in IP networks, they also may be applied to numerous other networks as well. In addition, while the present embodiments have been described in detail, various substitutions, modifications or alterations could be made to the descriptions set forth above without departing from the inventive scope which is defined by the following claims.

The invention claimed is:

1. A network performance monitoring system, comprising:
a database;
at least one network performance monitoring circuit coupled to a network along which network traffic flows in a form of packets, said at least one network performance monitoring circuit programmed to perform the steps of:
receiving a video packet communicated along the network;
determining whether data in the packet satisfies a rule set; and
responsive to determining that data in the packet satisfies a rule set, copying information relating to the packet to be stored into the database;
a recorder layer for communicating between the database and the monitoring circuit, the recorder layer comprising manager applications and meter reading applications, the recorder layer configured to provide the rule set in a flow store to a meter that identifies packets based on a service type and a Quality of Service (QoS) of each of the packets in response to the rule set, said meter programmed to perform the steps of:
selecting a source and a destination for each of the identified packets when the QoS exceeds a value; and
forwarding the selected packets to the recorder layer;
querying circuitry for querying the information communicated by the at least one network performance monitoring circuit to the database to identify an irregularity in the network traffic originated when a route related to the forwarded selected packets is compared to a route related to a source and a destination for each of the identified packets when the QoS does not exceed the value; and
corrective circuitry for electronically providing a corrective action with respect to the identified irregularity in the network traffic, the corrective action ensuring a quality of the video based on the compared routes.

2. The system of claim 1 wherein the database stores the rule set.

3. The system of claim 1 and further comprising a plurality of network performance monitoring circuits coupled to the network:
wherein the plurality of network performance monitoring circuits include the at least one network performance monitoring circuit; and
wherein each of the plurality of network performance monitoring circuits comprises a corresponding database.

4. The system of claim 3, wherein each of the plurality of network performance monitoring circuits is programmed to perform the steps of:
receiving a packet communicated along the network;
determining whether data in the packet satisfies a rule set; and
responsive to determining that data in the packet satisfies a rule set, copying information relating to the packet to be stored into the corresponding database.

5. The system of claim 4:
wherein the packet comprises a header and a payload; and
wherein the step of determining whether data in the packet satisfies a rule set comprises determining whether data in the header satisfies a rule set.

6. The system of claim 5 wherein the step of determining whether data in the header satisfies a rule set comprises determining whether a field in the header satisfies the rule set, wherein the field is selected from a set consisting of source address, destination address, type of service, packet size, and router port number.

7. The system of claim 5 wherein the step of determining whether data in the header satisfies a rule set comprises determining whether the packet comprises an internet control message protocol message.

8. The system of claim 4 wherein the step of determining whether data in the packet satisfies a rule set comprises determining whether one or more QoS parameters satisfy the rule set.

9. The system of claim 4:
wherein the packet comprises a header and a payload; and
wherein the step of determining whether data in the packet satisfies a rule set comprises determining whether data in the payload satisfies the rule set.

10. The system of claim 9 wherein the step of determining whether data in the packet satisfies a rule set comprises determining whether one or more QoS parameters in the payload satisfy the rule set.

11. The system of claim 4 wherein the copying step for each of the plurality of network performance monitoring circuits comprises copying a portion of the packet.

12. The system of claim 4 wherein the copying step for each of the plurality of network performance monitoring circuits comprises copying at least one statistic relating to the packet.

13. The system of claim 4 wherein each corresponding database stores the rule set for a corresponding network performance monitoring circuit.

14. The system of claim 13:
and further comprising a recorder layer for communicating between each corresponding database and network performance monitoring circuit;
wherein the recorder layer is operable to communicate the rule set from the corresponding database to the network performance monitoring circuit; and
wherein the recorder layer is operable to communicate the copied information relating to the packet from the network performance monitoring circuit to the corresponding database.

15. The system of claim 1, wherein the corrective action comprises re-routing network traffic.

16. The system of claim 4, wherein the corrective action is accomplished within five minutes of the queriying circuitry for querying detecting the identified irregularity.

17. The system of claim 1 wherein the network comprises an internet protocol network.

18. The system of claim 1 wherein the internet protocol network comprises the global internet.

19. The system of claim 1 wherein the network comprises a network selected from a group consisting of asynchronous transfer mode, token ring, Novell, and Apple Talk.

20. A method of monitoring the performance of a network along which network traffic flows in a form of packets, comprising:
receiving a video packet communicated along the network;
determining whether data in the packet satisfies a rule set;
responsive to determining that data in the packet satisfies a rule set, copying information relating to the packet to be stored into a database;
providing the rule set in a flow store to a meter, said meter:
identifying the packet based on a service type and a Quality of Service (QoS) in response to the rule set;
selecting a source and a destination for the packet when the QoS exceeds a value; and
forwarding the selected packet to the database;
storing a network flow in the database and corresponding to the information;
querying the information to identify an irregularity in the network traffic originated when a route related to the forwarded selected packets is compared to a route related to a source and a destination for a packets when the QoS does not exceed the value;
and providing a corrective action with respect to the identified irregularity in the network traffic, the corrective action ensuring a quality of the video based on the compared routes.

21. The method of claim 20 wherein the database stores the rule set.

22. The method of claim 20 and further comprising repeating each of the receiving, determining, and copying steps at different locations in the network.

23. The method of claim 22:
wherein the packet comprises a header and a payload; and
wherein the step of determining whether data in the packet satisfies a rule set comprises determining whether data in the header satisfies a rule set.

24. The method of claim 23 wherein each step of determining whether data in the header satisfies a rule set comprises determining whether a field in the header satisfies the rule set, wherein the field is selected from a set consisting of source address, destination address, type of service, packet size, and router port number.

25. The method of claim 23 wherein each step of determining whether data in the header satisfies a rule set comprises determining whether the packet comprises an internet control message protocol message.

26. The method of claim 23 wherein each step of determining whether data in the packet satisfies a rule set comprises determining whether one or more QoS parameters satisfy the rule set.

27. The method of claim 23:
wherein the packet comprises a header and a payload; and
wherein each step of determining whether data in the packet satisfies a rule set comprises determining whether data in the payload satisfies the rule set.

28. The method of claim 27 wherein each step of determining whether data in the packet satisfies a rule set comprises determining whether one or more QoS parameters in the payload satisfy the rule set.

29. The method of claim 23 wherein at least some of the copying steps comprise copying a portion of the packet.

30. The method of claim 23 wherein at least some of the copying steps comprise copying at least one statistic relating to the packet.

* * * * *